No. 739,434. PATENTED SEPT. 22, 1903.
L. MAYER.
FRICTION CLUTCH.
APPLICATION FILED FEB. 16, 1903.
NO MODEL. 3 SHEETS—SHEET 1.

Witnesses.
A. S. Kilgore.
A. H. Opsahl

Inventor.
Louis Mayer.
By his Attorneys.
Williamson & Merchant

No. 739,434. PATENTED SEPT. 22, 1903.
L. MAYER.
FRICTION CLUTCH.
APPLICATION FILED FEB. 16, 1903.
NO MODEL. 3 SHEETS—SHEET 2.

Witnesses.
H. A. Kilgore
A. H. Opsahl

Inventor.
Louis Mayer.
By his Attorneys.
Williamson & Merchant

No. 739,434. PATENTED SEPT. 22, 1903.
L. MAYER.
FRICTION CLUTCH.
APPLICATION FILED FEB. 16, 1903.
NO MODEL. 3 SHEETS—SHEET 3.
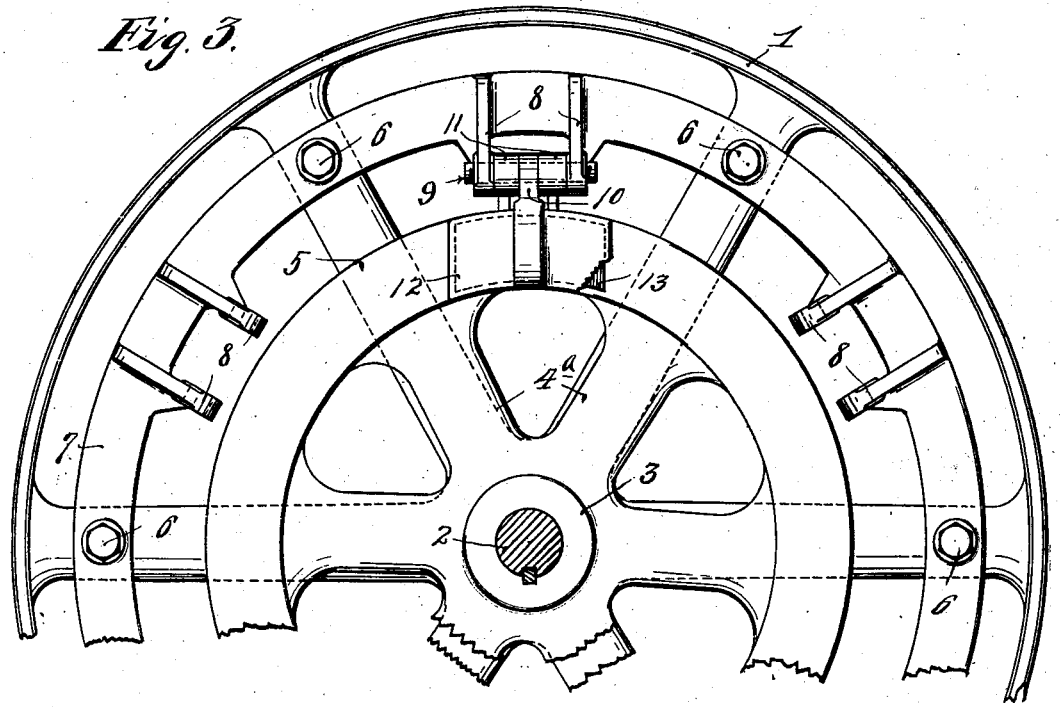
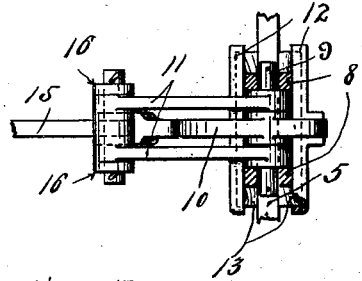
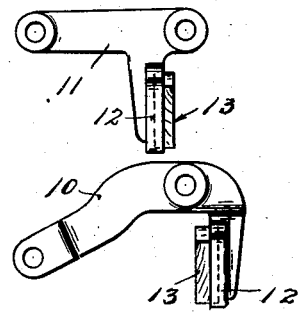
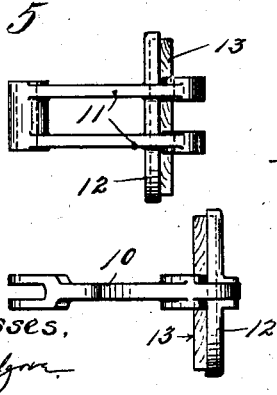
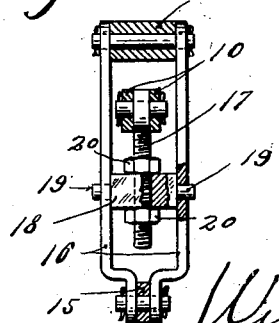
Witnesses,
H. D. Kilgore
A. H. Opsahl
Inventor.
Louis Mayer.
By his Attorneys,
Williamson & Merchant No. 739,434.

Patented September 22, 1903.

UNITED STATES PATENT OFFICE.

LOUIS MAYER, OF MANKATO, MINNESOTA.

FRICTION-CLUTCH.

SPECIFICATION forming part of Letters Patent No. 739,434, dated September 22, 1903.

Application filed February 16, 1903. Serial No. 143,480. (No model.)

*To all whom it may concern:*

Be it known that I, LOUIS MAYER, a citizen of the United States, residing at Mankato, in the county of Blue Earth and State of Minnesota, have invented certain new and useful Improvements in Friction-Clutches; and I do hereby declare the following to be a full, clear, and exact description of the invention, such as will enable others skilled in the art to which it appertains to make and use the same.

My invention has for its object to provide an improved friction-clutch especially adapted for connecting pulleys to running shafts, and vice versa.

To the above ends the invention consists of the novel devices and combinations of devices hereinafter described, and defined in the claims.

The invention is illustrated in the accompanying drawings, wherein like characters indicate like parts throughout the several views.

Figure 1:
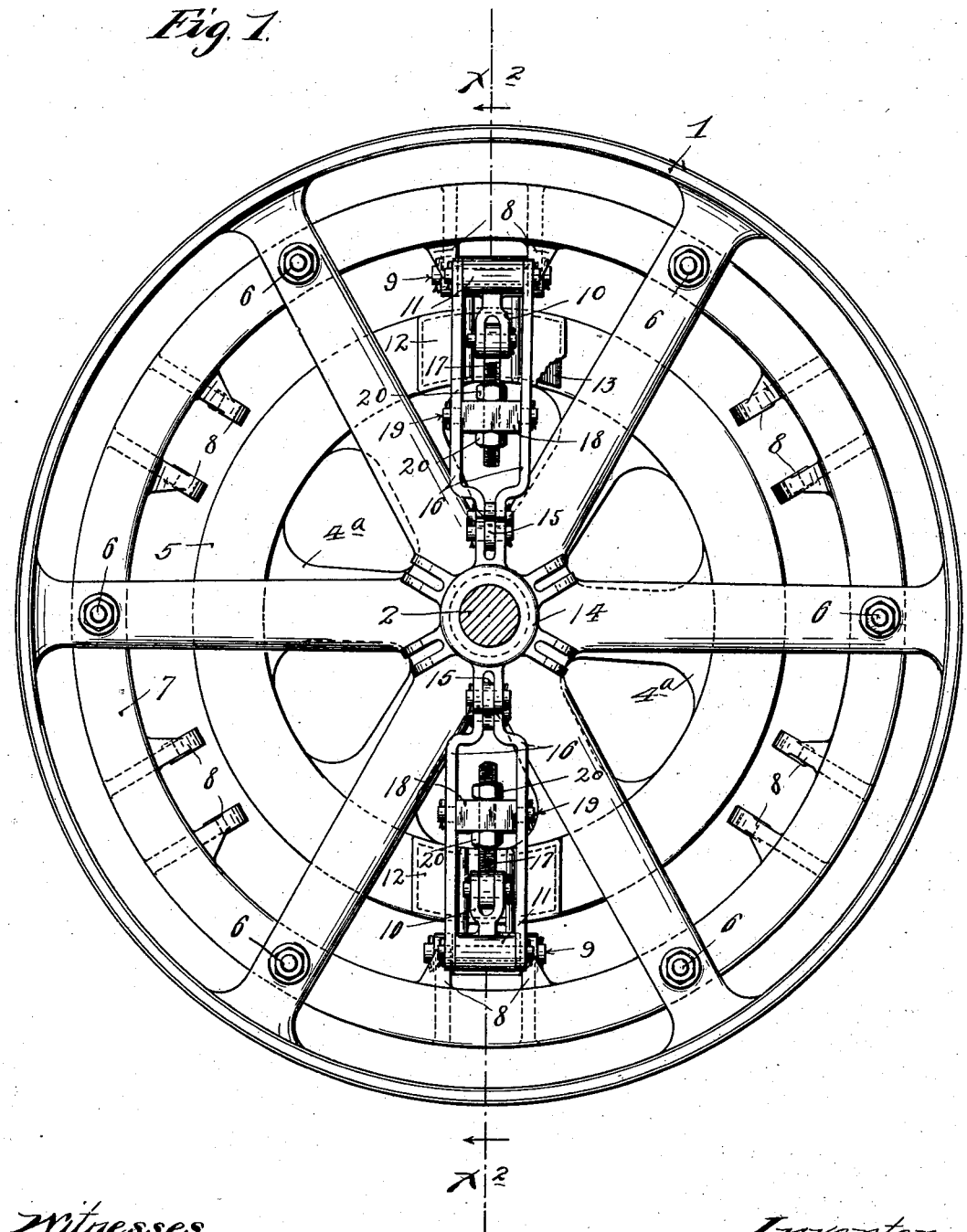
Figure 2:
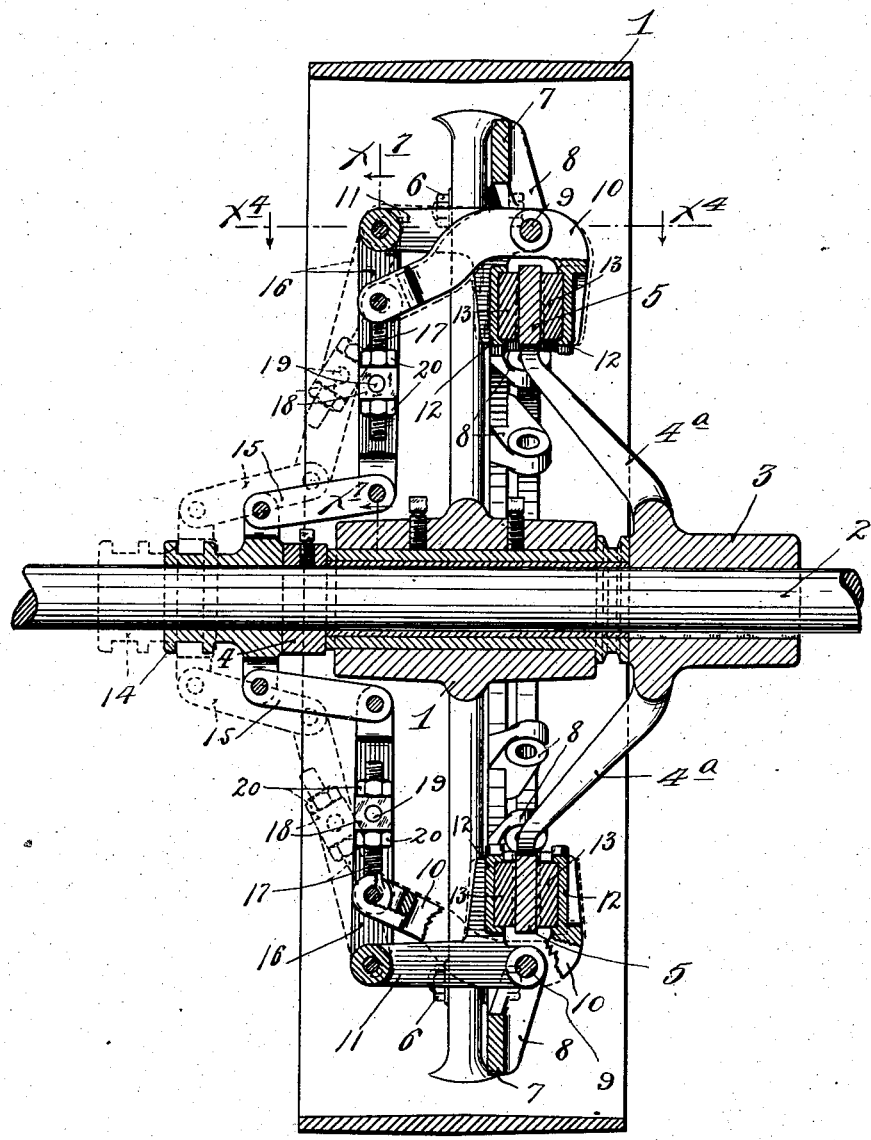

Figure 1 is a face view or side elevation of a pulley and illustrating my improved clutch applied thereto, some parts being broken away. Fig. 2 is a section on a line $x^2$ $x^2$ of Fig. 1. Fig. 3 shows a portion of the pulley and of the clutch, some parts being removed and others being broken away and looking at the said pulley from the opposite side from that shown in Fig. 1. Fig. 4 is a detail in horizontal section on the line $x^4$ $x^4$ of Fig. 2. Fig. 5 is a similar view to Fig. 4, but showing the parts separated. Fig. 6 is a view in side elevation showing in detail the cooperating jaws of the clutch separated or drawn apart; and Fig. 7 is a detail, principally in section, on the line $x^7$ $x^7$ of Fig. 2.

The numeral 1 indicates a pulley the hub of which runs loosely on a shaft 2 between the hub 3 and the collar 4, both of said parts 3 and 4 being rigidly secured to said shaft. The hub 3 has radial arms 4ª, that rigidly unite it to an annular clutch-flange 5. The clutch-flange 5 stands in a plane intersecting the axis of the shaft 2 at a right angle, and it stands close to the spokes of the pulley 1.

Rigidly secured to the spokes of the pulley 1 by a short nutted bolt 6 or otherwise is a bearing-link 7, provided with several pairs of laterally-spaced bearing-lugs 8. As shown, there are six pairs of bearing-lugs 8, and to each pair is pivoted, by means of a bearing-pin 9, a pair of cooperating clutch-jaws 10 and 11. The operative ends of the clutch-jaws 10 and 11 are formed with transversely-extended heads 12, that hold friction-blocks 13, of wood fiber or other suitable material. The friction-blocks 13 are by the jaws 10 and 11 pressed against the opposite faces of the clutch-flange 5. The projecting arm of the jaw 11 is bifurcated, as best shown in Figs. 4 and 5, and the projecting arm of the cooperating jaw 10 works between the sides of the bifurcated ends of said jaw 11.

Mounted to freely slide and rotate on the shaft 2 is a shipper-collar 14, to which, as shown, are pivotally connected six short links 15. The inner ends of the links 15 are connected to the bifurcated free ends of the corresponding clutch-jaws 11 by levers 16, which are shown as made up each of two straps or elements. To the free end of each clutch-jaw 10 is pivotally connected a short lever afforded by a screw-bolt 17, that works adjustably through a pivot-block 18, which in turn is pivotally connected to the intermediate portion of the corresponding two-part lever 16 by means of trunnions 19, as best shown in Fig. 7. Lock-nuts 20 on the screw-threaded bolts 17 clamp the opposite faces of the cooperating pivot-blocks 18 and secure the said bolts thereto in the desired adjustment. The levers or elements 16 and 17 constitute a toggle-lever which is moved to and from its buckled dead-center to set and release the clutch-jaws.

Operation: As is evident by sliding the shipper-sleeve 14 endwise on the shaft 2 by means of a shipper-lever, (not shown,) the lever 16 and 17 may be moved to and from the position indicated by full and dotted lines in Fig. 2. In the position indicated by full lines in Fig. 2 the cooperating levers 16 and 17 are on a dead-center with each other and with their pivotal connections to the arms of the clutch-jaws, and in such positions the friction-blocks 13 of the cooperating jaws are tightly pressed against the opposite faces of the clutch-flange 5. In the positions indicated by dotted lines in said Fig. 2 the said two links 16 and 17 are thrown from their dead-center and the free ends of the clutch-jaws are drawn farther apart, so that the friction-blocks 13 are moved away from the coöperating faces of the clutch-flange 5. As is evident, by varying the adjustments of the two links 16 and 17 any desired pressure or clamping friction may be put upon the clutch-flange by the friction-blocks 13 of the clutch-jaws. Under the above clamping action it is evident that the coöperating members of the pairs of clutch-jaws react one against the other, and hence no endwise thrusts or strains are put either upon the shaft or upon the pulley.

In frequently applying the clutch, as is necessary in many instances, the annular flange 5 will be considerably heated and will be caused to expand to a considerable extent. It is important to note, however, that in view of the fact that the said clutch 5 is extended in a plane at a right angle to or transversely of the axis of the shaft 2 and is engaged in the clutch-setting action only on its opposite faces the expansion above noted will not vary or interfere with the action of the clutch or require any readjustments of the parts thereof.

The clutch described, while simple, durable, and efficient, is of reasonably small cost and has few parts to be out of order. Adjustments to compensate for wear of the friction-blocks 13 may be readily made by readjusting the nuts 20 on the bolts or screw-threaded links 17. The clutch requires but little power to throw it either into or out of action. It will of course be understood that the clutch described is capable of considerable modification within the scope of my invention as herein set forth and claimed.

What I claim, and desire to secure by Letters Patent of the United States, is as follows:

1. The combination, with a pair of rotary members, of a friction-clutch for connecting them, comprising an annular clutch-flange carried by one of said rotary members and extending in a plane intersecting the axis of the same, approximately at a right angle, a pair of clutch-jaws in engagement with the opposite faces of said clutch-flange and connected to the other rotary member by a common pivot, and a toggle connecting the ends of said jaws, one member of said toggle being longer than the other, and with the shorter member of said toggle pivoted to the intermediate portion of the long member and arranged to permit the toggle members to be moved to and from a dead-center, substantially as described.

2. The combination with a pair of rotary members, of a friction-clutch for connecting them, comprising an annular flange, carried by one of said rotary members, and extending in a plane intersecting the axis thereof, approximately at a right angle, several pairs of clutch-jaws 10 and 11, pivotally connected to the other rotary member and provided with friction-blocks 13, engageable with the opposite faces of said flange 5, the relatively long levers 16, connected to the arms of the jaws 11, the threaded rods 17, connected to the arms of the said jaws 10, the pivot-blocks 18, applied to said levers 16, and to which the said rod 17 is adjustably connected, and a shipper-sleeve, connected to the inner ends of the several levers 17, for simultaneously operating the several pairs of clutch-jaws, substantially as described.

In testimony whereof I affix my signature in presence of two witnesses.

LOUIS MAYER.

Witnesses:
R. F. COOL,
GEO. G. KROSS.